US010634259B1

(12) United States Patent
Grayson et al.

(10) Patent No.: US 10,634,259 B1
(45) Date of Patent: Apr. 28, 2020

(54) GUIDE VANE CHECK VALVES

(71) Applicant: The Boeing Company, Chicago, IL (US)

(72) Inventors: Gary David Grayson, Issaquah, WA (US); Christopher C. Veto, Huntington Beach, CA (US); Victor John Barackman, Costa Mesa, CA (US); Henry Rodriguez, Diamond Bar, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/389,790

(22) Filed: Apr. 19, 2019

Related U.S. Application Data

(63) Continuation of application No. 15/249,203, filed on Aug. 26, 2016, now Pat. No. 10,323,761.

(51) Int. Cl.
*F16K 17/04* (2006.01)
*F16K 15/02* (2006.01)

(52) U.S. Cl.
CPC ............ *F16K 17/04* (2013.01); *F16K 15/025* (2013.01); *F16K 15/026* (2013.01); *Y10T 137/7938* (2015.04)

(58) Field of Classification Search
CPC ...... F16K 17/04; F16K 15/025; F16K 15/026; Y10T 137/7938
See application file for complete search history.

(56) References Cited

U.S. PATENT DOCUMENTS

| 3,370,508 A | 2/1968 | Iaia | B23C 3/28 |
| | | | 144/86 |
| 3,457,949 A | 7/1969 | Coulter | F16K 15/026 |
| | | | 137/516.27 |

(Continued)

FOREIGN PATENT DOCUMENTS

| DE | 3441282 | 6/1985 |
| DE | 19643749 | 4/1998 |

(Continued)

OTHER PUBLICATIONS

Martinez et al., "*Lessons Learned from the Design, Certification, and Operation of the Space Shuttle Integrated Main Propulsion System (IMPS)*," AIAA 2011-5838, 47th AIAA/ASME/SAE/ASEE Joint Propulsion Conference & Exhibit, San Diego, California, Jul. 31-Aug. 3, 2011.

(Continued)

*Primary Examiner* — Marina A Tietjen
*Assistant Examiner* — Frederick D Soski
(74) *Attorney, Agent, or Firm* — DASCENZO Intellectual Property Law, P.C.

(57) ABSTRACT

Guide vane check valve assemblies and poppets for guide vane check valve assemblies are disclosed. A guide vane poppet includes an elongate central core configured to form a fluid seal with a valve body of the check valve assembly. The guide vane poppet additionally includes an elongate outer skirt and at least one guide vane radially extending between the elongate central core and the elongate outer skirt. A check valve assembly includes a valve body with a central cavity, an inlet to the central cavity, an outlet from the central cavity, and a spring seat, and further includes a spring and a poppet. The spring is oriented to press against the poppet and to urge a poppet-side sealing surface of the (Continued)

poppet into sealing engagement with a body-side sealing surface of the valve body.

23 Claims, 5 Drawing Sheets

(56) References Cited

U.S. PATENT DOCUMENTS

| | | | |
|---|---|---|---|
| 3,731,905 A | 5/1973 | Piet | F16K 11/044 137/62 |
| 3,831,951 A | 8/1974 | Patel | F16J 15/062 277/64 |
| 3,874,541 A | 4/1975 | Lagneaux | B65D 39/04 215/25 |
| 4,149,560 A | 4/1979 | Berg | |
| 4,270,441 A | 6/1981 | Tuck, Jr. | F16J 3/02 92/102 |
| 4,385,514 A | 5/1983 | Sassak | B21D 39/04 29/508 |
| 4,566,485 A | 1/1986 | Ruhle | F04B 15/04 137/37 |
| 5,041,257 A | 8/1991 | Sepso | F25B 41/06 137/513.3 |
| 5,097,864 A | 3/1992 | Myers | B29C 45/52 137/528 |
| 5,183,075 A | 2/1993 | Stein | F02M 59/462 137/493.6 |
| 5,271,429 A | 12/1993 | Bauer | B01D 35/147 137/543.23 |
| 5,745,834 A | 4/1998 | Bampton | B22F 3/10 419/37 |
| 5,805,971 A | 9/1998 | Akedo | B22F 3/115 419/6 |
| 5,857,897 A | 1/1999 | Krcek | B21D 28/28 451/28 |
| 6,431,521 B1 | 8/2002 | Jones | F16K 1/38 251/319 |
| 2003/0092302 A1 | 5/2003 | Conway | B25B 27/0028 439/27 |
| 2004/0000342 A1 | 1/2004 | Takahashi | F16K 15/026 137/538 |
| 2006/0260693 A1 | 11/2006 | Chalk | F04B 53/1022 137/51 |
| 2008/0029972 A1 | 2/2008 | Smathers | F16J 15/062 277/64 |
| 2014/0345706 A1 | 11/2014 | Maibaum | F16K 15/026 137/223 |
| 2017/0345706 A1 | 11/2017 | Tsai et al. | |

FOREIGN PATENT DOCUMENTS

| | | |
|---|---|---|
| EP | 0264203 | 4/1988 |
| WO | WO 2010/118501 | 10/2010 |

OTHER PUBLICATIONS

Barrett et al., "Space Shuttle Simplified Lo2 Check Valve Development Tests," Journal of Propulsion and Power, vol. 11, No. 2, pp. 324-329, Mar.-Apr. 1995.

Murdock, J.W., Mechanics of Fluids, Marks' Standard Handbook for Mechanical Engineers, $11^{th}$ ed., pp. 3-29 to 3-61, 2007.

"Flow of Fluids Through Valves, Fittings, and Pipe," Crane Valves North America, Engineering Department, Technical Paper No. 410, 1988.

Machine-generated English translation of the abstract of DE 3441282, downloaded from Espacenet.com on Jan. 2, 2018.

Machine-generated English translation of the abstract of DE 19643749, downloaded from Espacenet.com on Aug. 17, 2018.

GUIDE VANE CHECK VALVES

RELATED APPLICATION

This application is a continuation of and claims priority to U.S. patent application Ser. No. 15/249,203, filed on Aug. 26, 2016 and entitled GUIDE VANE CHECK VALVES, the complete disclosure of which is incorporated herein by reference.

This invention was made with Government support under Contract No. HR0011-14-9-0005 awarded by Department of Defense Advanced Research Projects Agency. The Government has certain rights in this invention.

FIELD

The present disclosure relates generally to guide vane check valves, to guide vane check valve assemblies, and to poppets for guide vane check valve assemblies.

BACKGROUND

Many fluid piping networks rely on check valves to permit fluid flow in one direction but limit the fluid flow in another direction. In the aerospace and automotive industries, pressure drop, weight, and cost of the check valve are important parameters for vehicle performance and economics. The check valve functionality has been achieved by several distinct designs, including a ball and linear spring, a flapper and torsional spring, and flat springs, with the ball and linear spring design being the most common. However, the ball and linear spring design may exhibit a significant pressure drop across the check valve, and sensitivity to lateral vibration may lead to chatter of the ball, allowing flow to leak in the reverse direction and/or decreasing the lifespan of the check valve.

SUMMARY

Guide vane check valves, guide vane check valve assemblies, and poppets for guide vane check valve assemblies are disclosed. A guide vane poppet for a check valve assembly includes an elongate central core with a first core end, a second core end, and an outer core surface extending between the first core end and the second core end. The first core end defines a poppet-side sealing surface configured to form a fluid seal with a corresponding body-side sealing surface of a valve body of the check valve assembly. The guide vane poppet additionally includes an elongate outer skirt with an inner skirt surface and at least one guide vane radially extending between the outer core surface and the inner skirt surface. The elongate outer skirt may be configured to operatively engage an inner surface of a valve body of the check valve assemblies, such as to restrict the guide vane poppet from tilting with respect to the valve body. The at least one guide vane may be shaped to direct fluid flow within an annular region that extends between the outer core surface and the inner skirt surface.

The elongate central core defines a recess that extends from the second core end toward the first core end. The elongate central core also may include at least one pressure-relief opening extending from the recess and to the outer core surface. The recess and the at least one pressure-relief opening may reduce a weight of a check valve assembly that includes the guide vane poppet and/or may reduce a pressure drop across the check valve assembly when a fluid flows through the check valve assembly.

DESCRIPTION

FIGS. 1-11 provide illustrative, non-exclusive examples of guide vane poppets 100, of components and/or features of guide vane poppets 100, and/or of check valve assemblies 20 including guide vane poppets 100, according to the present disclosure. Elements that serve a similar, or at least substantially similar, purpose are labeled with like numbers in each of FIGS. 1-11, and these elements may not be discussed in detail herein with reference to each of FIGS. 1-11. Similarly, all elements may not be labeled in each of FIGS. 1-11, but reference numerals associated therewith may be utilized herein for consistency. Elements, components, and/or features that are discussed herein with reference to one or more of FIGS. 1-11 may be included in and/or utilized with any of FIGS. 1-11 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a given embodiment without departing from the scope of the present disclosure.

Figure 1:
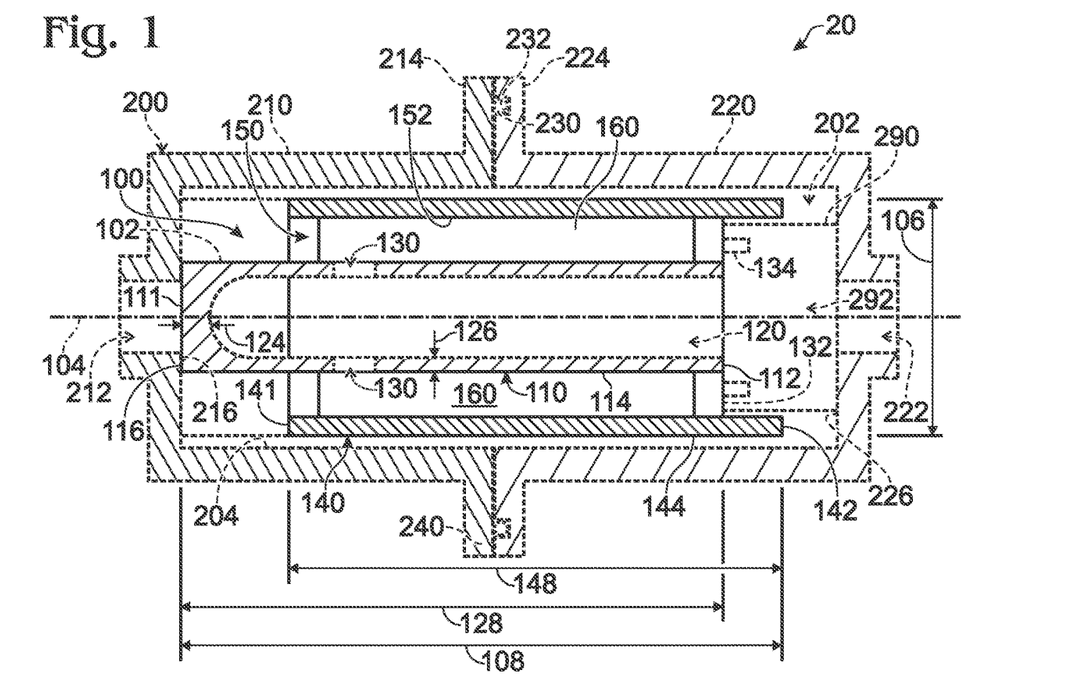
FIG. 1 is a schematic view of illustrative, non-exclusive examples of poppets that may form a portion of check valve assemblies, according to the present disclosure.

FIG. 1 is a schematic view of illustrative, non-exclusive examples of guide vane poppets 100 that may form a portion of check valve assemblies 20, according to the present disclosure, while FIGS. 2-11 are less schematic views of an example of a check valve assembly 20 that includes a guide vane poppet 100, according to the present disclosure. Guide vane poppets 100 also may be referred to herein as poppets 100, and check valve assemblies 20 also may be referred to herein as valve assemblies 20, as check valves 20, as guide vane check valves 20, as guidevane check valves 20, and/or as guide vane check valve assemblies 20.

In general, and as discussed in detail herein, guide vane poppets 100 and/or check valve assemblies 20 may be more lightweight, cheaper to manufacture, and/or faster to build than prior designs. The reduced-weight properties of check valve assemblies 20 and/or components thereof may be valuable in the aerospace industry, as any unnecessary component weight corresponds to unnecessary fuel expenditure when the component is utilized. As discussed herein, components of check valve assemblies 20 may utilize additive manufacturing techniques to reduce component cost and/or weight. Additionally, and as discussed herein, guide vane poppets 100 are configured to offer improved fluid flow through check valve assemblies 20, such as by reducing a pressure drop across check valve assemblies 20.

As schematically illustrated in FIG. 1, a guide vane poppet 100 for a check valve assembly 20 includes an elongate central core 110 having a first core end 111, a second core end 112, and an outer core surface 114 extending between first core end 111 and second core end 112. Outer core surface 114 may be a cylindrical, or at least substantially cylindrical, outer core surface 114. First core end 111 defines a poppet-side sealing surface 116 configured to form a fluid seal with a corresponding body-side sealing surface 216 of a valve body 200 of check valve assembly 20.

Figure 4:
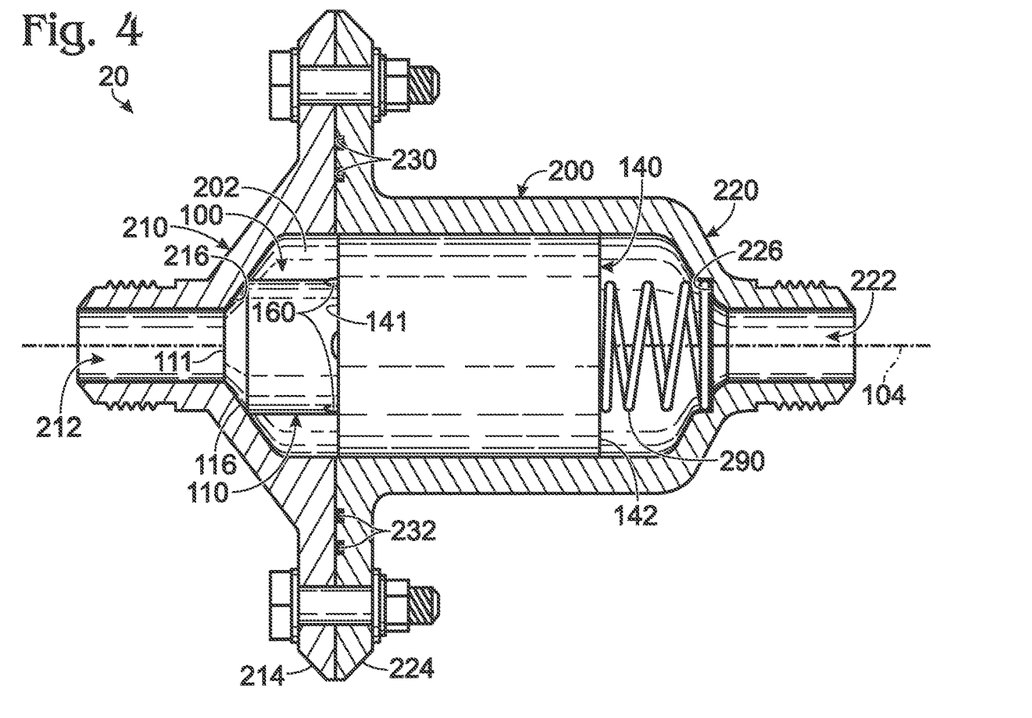
FIG. 4 is a cutaway side view of the check valve assembly of FIGS. 2-3 in a closed position.
Figure 5:
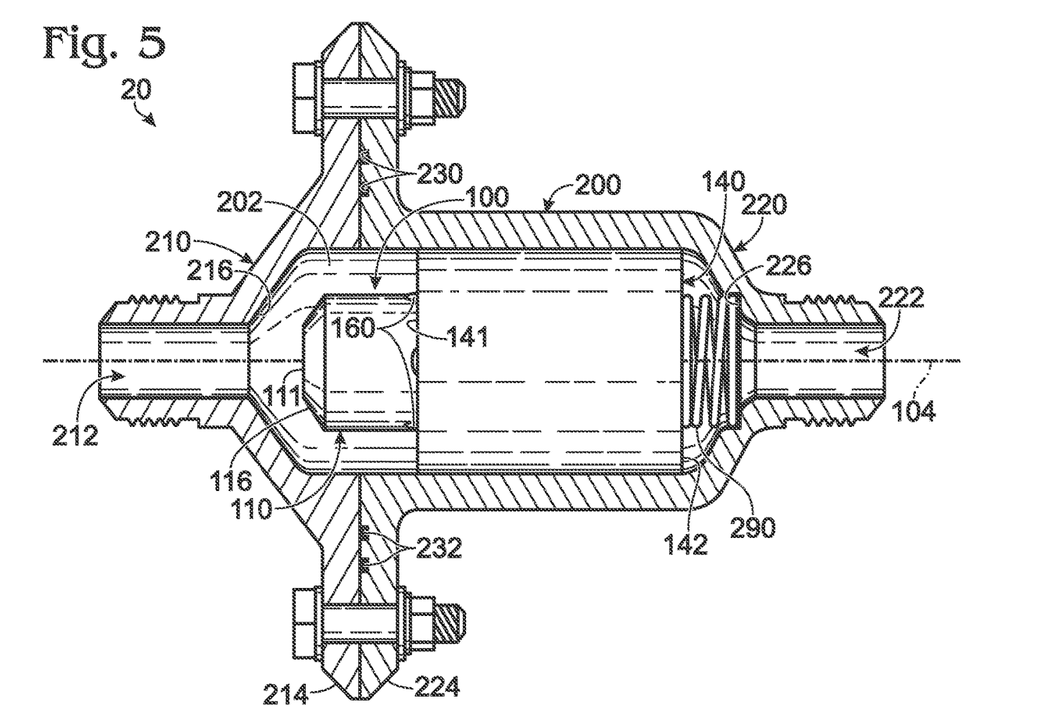
FIG. 5 is a cutaway side view of the check valve assembly of FIGS. 2-4 in an open position.

As schematically illustrated in FIG. 1, valve body 200 of check valve assembly 20 generally includes a central cavity 202, an inlet 212 to central cavity 202, and an outlet 222 from central cavity 202. Inlet 212 may be referred to herein as being on, or as facing toward, an inlet side of check valve assembly 20, and outlet 222 may be referred to herein as being on, or as facing toward, an outlet side of check valve assembly 20. Check valve assembly 20 generally defines an open configuration, as illustrated in FIG. 5, in which check valve assembly 20 permits fluid flow from inlet 212 to outlet 222, and a closed configuration, as illustrated in FIG. 4, in which check valve assembly 20 resists fluid flow between inlet 212 and outlet 222. Check valve assembly 20 generally is biased toward the closed configuration by a spring 290 that urges poppet-side sealing surface 116 toward body-side sealing surface 216. Spring 290 also may be referred to herein as a biasing mechanism 290.

Stated differently, check valve assembly 20 may be configured to resist fluid flow from outlet 222 to inlet 212 and to selectively permit fluid flow from inlet 212 to outlet 222. When check valve assembly 20 is in the closed configuration, poppet-side sealing surface 116 is sealingly engaged with body-side sealing surface 216, whereas when check valve assembly 20 is in the open configuration, poppet-side sealing surface 116 is at least partially disengaged from body-side sealing surface 216 to permit fluid flow from inlet 212 to outlet 222.

As schematically illustrated in FIG. 1, poppet 100 additionally includes an elongate outer skirt 140 having a first skirt end 141, a second skirt end 142, an outer skirt surface 144, and an inner skirt surface 152, such that outer skirt surface 144 and inner skirt surface 152 extend between first skirt end 141 and second skirt end 142. Elongate outer skirt 140 generally is configured to slidingly engage an inner surface 204 of central cavity 202, such as to restrict tilting of poppet 100 with respect to valve body 200. Stated differently, elongate outer skirt 140 generally is configured to retain poppet 100 in an orientation that is coaxial, or at least substantially coaxial, with valve body 200 as check valve assembly 20 transitions between the open configuration and the closed configuration.

Outer skirt surface 144 may be a cylindrical, or at least substantially cylindrical, outer skirt surface 144. Similarly, inner skirt surface 152 may be a cylindrical, or at least substantially cylindrical, inner skirt surface 152. Additionally or alternatively, elongate outer skirt 140 may be a hollow cylindrical elongate outer skirt 140, and/or may be coaxial, or at least substantially coaxial, with elongate central core 110. Elongate outer skirt 140 may have any appropriate dimensions relative to elongate central core 110. As examples, outer core surface 114 of elongate central core 110 may have an outer diameter, an effective outer diameter, or an average effective outer diameter, and inner skirt surface 152 may have an inner diameter, an average inner diameter, or an average effective inner diameter, such that the average outer diameter is at least 20%, at least 30%, at least 40%, at least 50%, at least 60%, at least 70%, at most 90%, at most 80%, at most 70%, at most 60%, and/or at most 50% of the average inner diameter.

Poppet 100 further includes at least one guide vane 160 radially extending between outer core surface 114 and inner skirt surface 152. As discussed in more detail herein, the at least one guide vane 160 is configured to retain elongate outer skirt 140 in a generally fixed spatial relationship with respect to elongate central core 110 as well as to direct fluid flow through poppet 100 when check valve assembly 20 is in the open configuration.

Figures 7, 8, 10, 11:
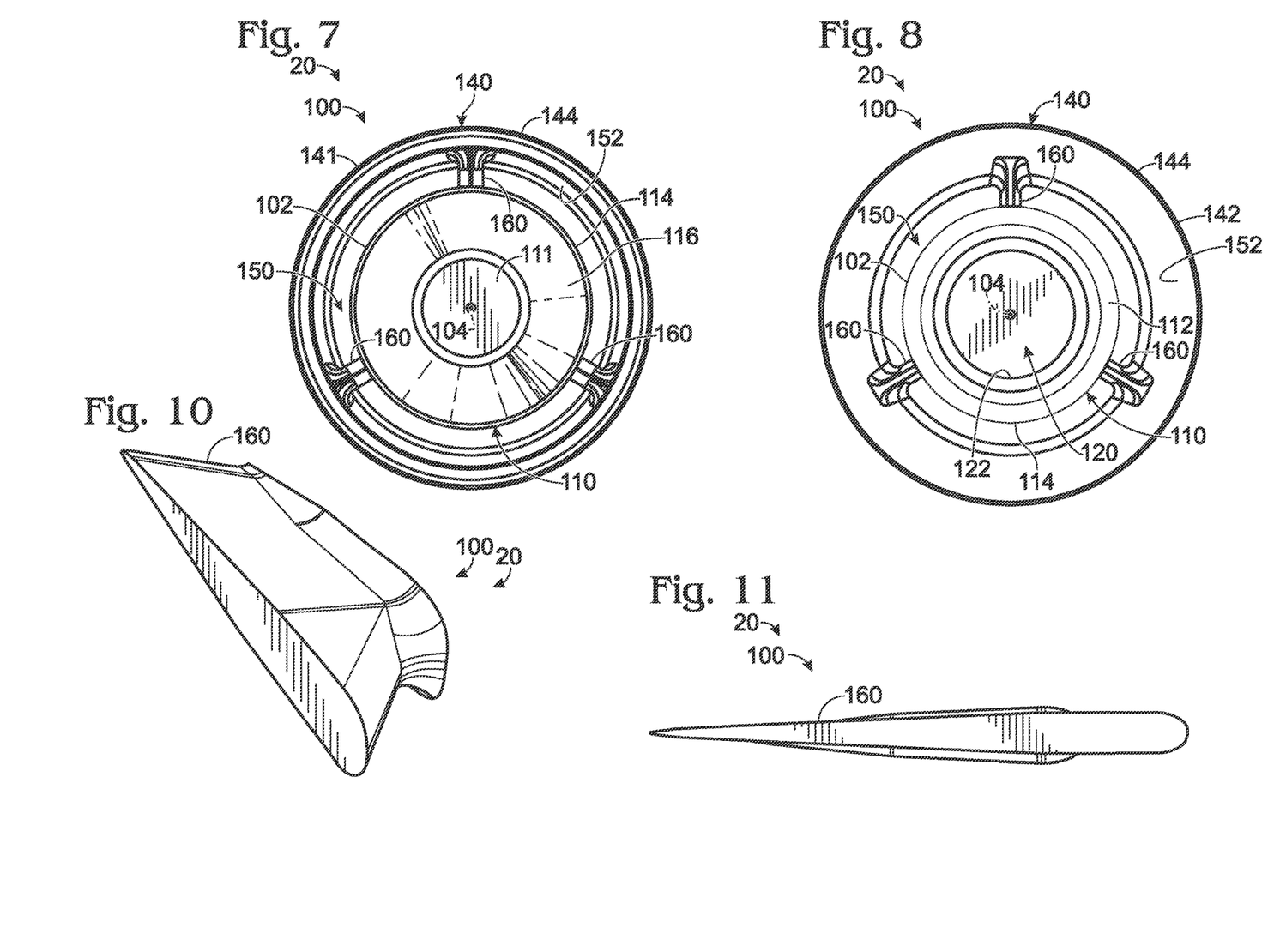
FIG. 7 is an inlet-side view of a poppet of the check valve assembly of FIGS. 2-6.
FIG. 8 is an outlet-side view of the poppet of FIG. 7.
FIG. 10 is a perspective view of a guide vane of the poppet of FIGS. 7-9.
FIG. 11 is a side view of the guide vane of FIG. 10.
Figure 9:
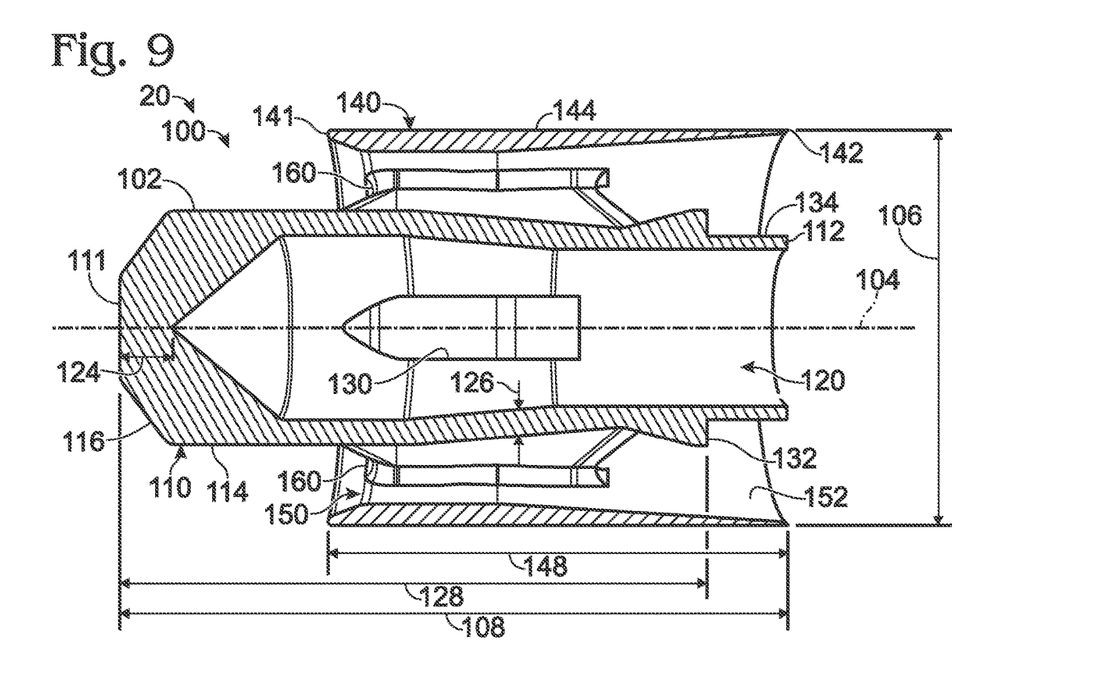
FIG. 9 is a cross-sectional side view of the poppet of FIGS. 7-8.

With continued reference to FIG. 1, and as perhaps best illustrated in FIGS. 8-9, elongate central core 110 may be a hollow elongate central core 110 and/or may define a recess 120 that extends from second core end 112 toward first core end 111. As discussed herein, recess 120 may be configured to reduce a weight of poppet 100 and/or to enhance a fluid flow property through check valve assembly 20.

Recess 120 may extend any appropriate fraction of a length of elongate central core 110. As examples, and as illustrated in FIGS. 1 and 9, elongate central core 110 has a core length 128 as measured along a longitudinal axis 104 of elongate central core 110, and recess 120 may extend along at least 20%, at least 30%, at least 40%, at least 50%, at least 60%, at least 70%, at least 80%, at least 90%, at most 95%, at most 90%, at most 80%, at most 70%, at most 60%, and/or at most 50% of core length 128.

Similarly, recess 120 may extend across any appropriate fraction of a width of elongate central core 110. As an example, and as illustrated in FIGS. 1 and 9, elongate central core 110 defines a first core end thickness 124 as measured along longitudinal axis 104 and between first core end 111 and recess 120 and further defines an average core wall thickness 126 as measured transverse to longitudinal axis 104 and between outer core surface 114 and recess 120. First core end thickness 124 may be greater than average core wall thickness 126. As more specific examples, recess 120 may extend into elongate central core 110 such that a ratio of first core end thickness 124 to average core wall thickness 126 is at least 1.1, at least 1.2, at least 1.4, at least 1.6, at least 1.8, at least 2, at most 5, at most 4, at most 3, at most 2, at most 1.75 and/or at most 1.5. Additionally or alternatively, recess 120 may assume any appropriate shape. For example, recess 120 may be at least partially conical, and/or may be at least partially cylindrical. As a more specific example, in the embodiment illustrated in FIG. 9, recess 120 is generally conical in a region proximal first core end 111 and is generally cylindrical in a region proximal second core end 112.

As schematically illustrated in FIG. 1 and less schematically illustrated in FIG. 9, elongate central core 110 of poppet 100 additionally may include at least one pressure-relief opening 130 extending from recess 120 and to outer core surface 114. Pressure-relief opening 130 generally is sized to decrease a pressure drop across poppet 100 during fluid flow through check valve assembly 20. For example, in a check valve assembly 20 that lacks pressure-relief opening 130, fluid flowing past elongate central core 110 may form a boundary layer adjacent outer core surface 114, which in turn may produce a static pressure gradient in the fluid proximate second core end 112 of elongate central core 110 and/or introduce drag in the fluid flow. Thus, pressure-relief opening 130 may be configured to bleed the boundary layer of fluid from outside elongate central core 110 so as to re-equalize the fluid static pressure proximate second core end 112, thereby reducing a fluid drag through check valve assembly 20 and/or a pressure drop across check valve assembly 20. A flow of fluid through pressure-relief opening 130 may be characterized, for example, by a Fanno model of fluid flow.

Stated differently, pressure-relief opening 130 provides a path for fluid to flow from external elongate central core 110 into recess 120 during fluid flow through check valve assembly 20, thus decreasing a fluid resistance and/or a fluid drag through check valve assembly 20. This additional flow path may particularly decrease a resistance to fluid flow through check valve assembly 20 in a configuration in which spring 290 is significantly compressed. Specifically, in such a configuration, spring 290 may act as a barrier against fluid flow from a region external elongate central core 110 to outlet 222, whereas fluid alternatively may flow unimpeded through pressure-relief opening 130 and recess 120 to outlet 222. Elongate central core 110 may include a plurality of pressure-relief openings 130 equally and/or circumferentially spaced about longitudinal axis 104. As examples, elongate central core 110 may include at least 2, at least 3, at least 4, at least 5, or at least 6 pressure-relief openings 130.

Each pressure-relief opening 130 additionally may have any appropriate pressure-relief opening cross-sectional area for fluid flow therethrough. As examples, the pressure-relief opening cross-sectional area may be at least 1%, at least 5%, at least 10%, at least 15%, at most 25%, at most 20%, at most 15%, and/or at most 10% of an outer core surface area of outer core surface 114. Similarly, each pressure-relief opening 130 may have any appropriate shape. As examples, a shape of each pressure-relief opening 130 may include and/or be square, rectangular, triangular, circular, elliptical, trapezoidal, quadrilateral, pentagonal, and/or hexagonal.

Recess 120 may include an etched recess pattern (not illustrated) configured to wick fluid past pressure-relief openings 130 and toward second core end 112. The etched recess pattern may include and/or be rectilinear lands, spiral lands, and/or a Bejan Constructal Theory T-network of free distribution of flow.

As discussed, poppet 100 is configured to form a fluid seal with valve body 200 via an interface between poppet-side sealing surface 116 and body-side sealing surface 216. Thus, it may be desirable to limit a surface roughness of at least poppet-side sealing surface 116. For example, poppet-side sealing surface 116 may be a machined poppet-side sealing surface 116. Additionally or alternatively, poppet-side sealing surface 116 may have an average poppet-side sealing surface roughness that is less than a threshold fraction of a poppet surface roughness of a remainder of poppet 100, examples of which include less than 80%, less than 60%, less than 40%, less than 30%, less than 20%, less than 10%, less than 5%, less than 1%, and/or less than 0.1%. Additionally or alternatively, poppet-side sealing surface 116 may be characterized by a surface roughness that is at most 100 microinch arithmetic mean roughness (mRa), at most 80 mRa, at most 60 mRa, at most 40 mRa, at most 30 mRa, at most 25 mRa, at most 20 mRa, at most 15 mRa, and/or at most 10 mRa.

As discussed, poppet 100 includes at least one guide vane 160, which may include and/or be a plurality of guide vanes 160. For example, and as illustrated in FIGS. 7-8, poppet 100 may include a plurality of guide vanes 160 equally and circumferentially spaced about longitudinal axis 104 of elongate central core 110. While FIGS. 7-8 illustrate an embodiment of poppet 100 that includes 3 guide vanes 160, this is not required, and it is within the scope of the present disclosure that poppet 100 include any suitable number of guide vanes 160, including at least 2, at least 3, at least 4, at least 5, or at least 6 guide vanes 160. Additionally or alternatively, in an embodiment of poppet 100 that includes a plurality of pressure-relief openings 130, the number of guide vanes 160 may be equal to the number of pressure-relief openings 130. In such a configuration, a corresponding pressure-relief opening 130 may extend between each adjacent pair of guide vanes 160.

As discussed, guide vanes 160 of poppet 100 generally are configured to operatively support elongate outer skirt 140 relative to elongate central core 110. Stated differently, guide vanes 160 of poppet 100 are configured to operatively attach elongate central core 110 to elongate outer skirt 140 and hence to retain a fixed, or at least substantially fixed, spatial relationship between elongate central core 110 and elongate outer skirt 140. Guide vanes 160 may be linear or twisted in worm gear geometry. Additionally or alternatively, check valve assembly 20 may include one or more guiderails extending generally between elongate outer skirt 140 and inner surface 204 of valve body 200, and which may have a twist or may be rectilinear in shape.

Additionally, guide vanes 160 may be shaped to direct fluid flow within an annular region 150 that extends between outer core surface 114 of elongate central core 110 and inner skirt surface 152 of elongate outer skirt 140. For example, guide vanes 160 may be shaped to direct fluid flow within annular region 150 in a direction that is parallel, or at least substantially parallel, to longitudinal axis 104 of elongate central core 110. As more specific examples, and as illustrated in FIGS. 10-11, each guide vane 160 may have an airfoil-shaped and/or raindrop-shaped cross-sectional profile. Stated differently, each guide vane 160 may have a cross-sectional profile that is symmetric about a plane that includes longitudinal axis 104 and that tapers in width from an end of guide vane 160 that is proximal first core end 111 toward an end of guide vane 160 that is proximal second core end 112. In such a configuration, guide vanes 160 may increase a degree of laminar fluid flow through poppet 100 and/or decrease a degree of turbulent fluid flow through poppet 100 when check valve assembly 20 is in the open configuration. This in turn may decrease a net drag in the fluid flow through poppet 100, thereby decreasing a pressure drop of the fluid across check valve assembly 20 when check valve assembly 20 is in the open configuration. Additionally or alternatively, guide vanes 160 may be configured to provide flow straightening within check valve assembly 20 and/or to provide a more consistent outlet velocity profile of fluid flowing through outlet 222.

As schematically illustrated in FIG. 1, and less schematically illustrated in FIG. 9, poppet 100 additionally includes a poppet-side spring seat 132 configured to receive spring 290, which is configured to bias poppet 100 into sealing engagement with valve body 200. Poppet-side spring seat 132 may be defined by any appropriate portion of poppet 100, such as second core end 112, second skirt end 142, and/or a region of at least one guide vane 160 that extends between second core end 112 and second skirt end 142. As illustrated in FIGS. 1 and 9, elongate central core 110 additionally may include a projecting region 134 that projects from second core end 112 and that is configured to extend within a central bore 292 of spring 290, such as to retain spring 290 in an orientation that is coaxial, at least substantially coaxial, or rectilinear with elongate central core 110.

Poppet 100 may be constructed and/or formed in any appropriate manner. For example, poppet 100 may include and/or be a unitary poppet body 102 that defines elongate central core 110, elongate outer skirt 140, and guide vanes 160. As illustrated in FIGS. 1 and 9, poppet 100 defines a poppet length 108 as measured along longitudinal axis 104 of elongate central core 110 and an outer diameter 106 as measured about a transverse cross-section of elongate outer skirt 140. Poppet 100 may have any appropriate size and/or shape. As examples, a ratio of poppet length 108 to outer diameter 106 may be at least 1.25, at least 1.5, at least 1.75, at least 2, at least 2.25, at least 5, at most 4, at most 3.5, at most 3, at most 2.5, at most 2, and/or at most 1.5. As further examples, poppet length 108 may be at least 4 centimeters (cm), at least 6 cm, at least 8 cm, at least 10 cm, at most 20 cm, at most 15 cm, at most 10 cm, and/or at most 7.5 cm. Such a configuration may restrict poppet 100 from cocking within central cavity 202.

Additionally, elongate outer skirt 140 may have any appropriate positional and/or size relationship with elongate central core 110. As examples, a ratio of core length 128 of elongate central core 110 to a skirt length 148 of elongate outer skirt 140 (as measured along longitudinal axis 104) may be at least 1, at least 1.1, at least 1.2, at least 1.3, at least 1.4, at least 1.5, at most 2, at most 1.8, at most 1.6, at most 1.4, and/or at most 1.2. Additionally or alternatively, and as illustrated in FIGS. 1, 4-6 and 9, first skirt end 141 of elongate outer skirt 140 may be positioned between first core end 111 and second core end 112 of elongate central core 110 (as measured along longitudinal axis 104). Stated differently, at least a fraction of core length 128 may project from first skirt end 141 along longitudinal axis 104. As examples, the fraction of core length 128 that projects from first skirt end 141 may be at least 5%, at least 10%, at least 15%, at least 20%, at least 25%, at least 30%, at least 35%, at most 50%, at most 45%, at most 40%, at most 35%, at most 30%, and/or at most 25%. Similarly, second skirt end 142 of elongate outer skirt 140 may be positioned between first core end 111 and second core end 112 of elongate central core 110 (as measured along longitudinal axis 104).

Guide vane poppets 100, according to the present disclosure, may be utilized in conjunction with any appropriate housing to form check valve assembly 20, examples of which are illustrated in FIG. 1-6. As illustrated collectively by FIGS. 2-6, check valve assembly 20 includes valve body 200, spring 290, and poppet 100. Valve body 200 includes central cavity 202, inlet 212 to central cavity 202, outlet 222 from central cavity 202, body-side sealing surface 216, and a body-side spring seat 226 within central cavity 202 and proximate outlet 222. Poppet 100 is oriented within cavity 202 such that poppet-side sealing surface 116 is proximate body-side sealing surface 216. Spring 290 is operatively engaged with body-side spring seat 226 and is oriented within central cavity 202 to press against poppet 100 and/or to urge poppet-side sealing surface 116 into sealing engagement with body-side sealing surface 216. Central cavity 202 may be a cylindrical, or at least substantially cylindrical, central cavity 202. Additionally or alternatively, a shape of central cavity 202 may correspond to a shape of outer skirt surface 144 of elongate outer skirt 140 such that poppet 100 may transition between the closed configuration of FIG. 4 and the open configuration of FIG. 5.

Figure 6:
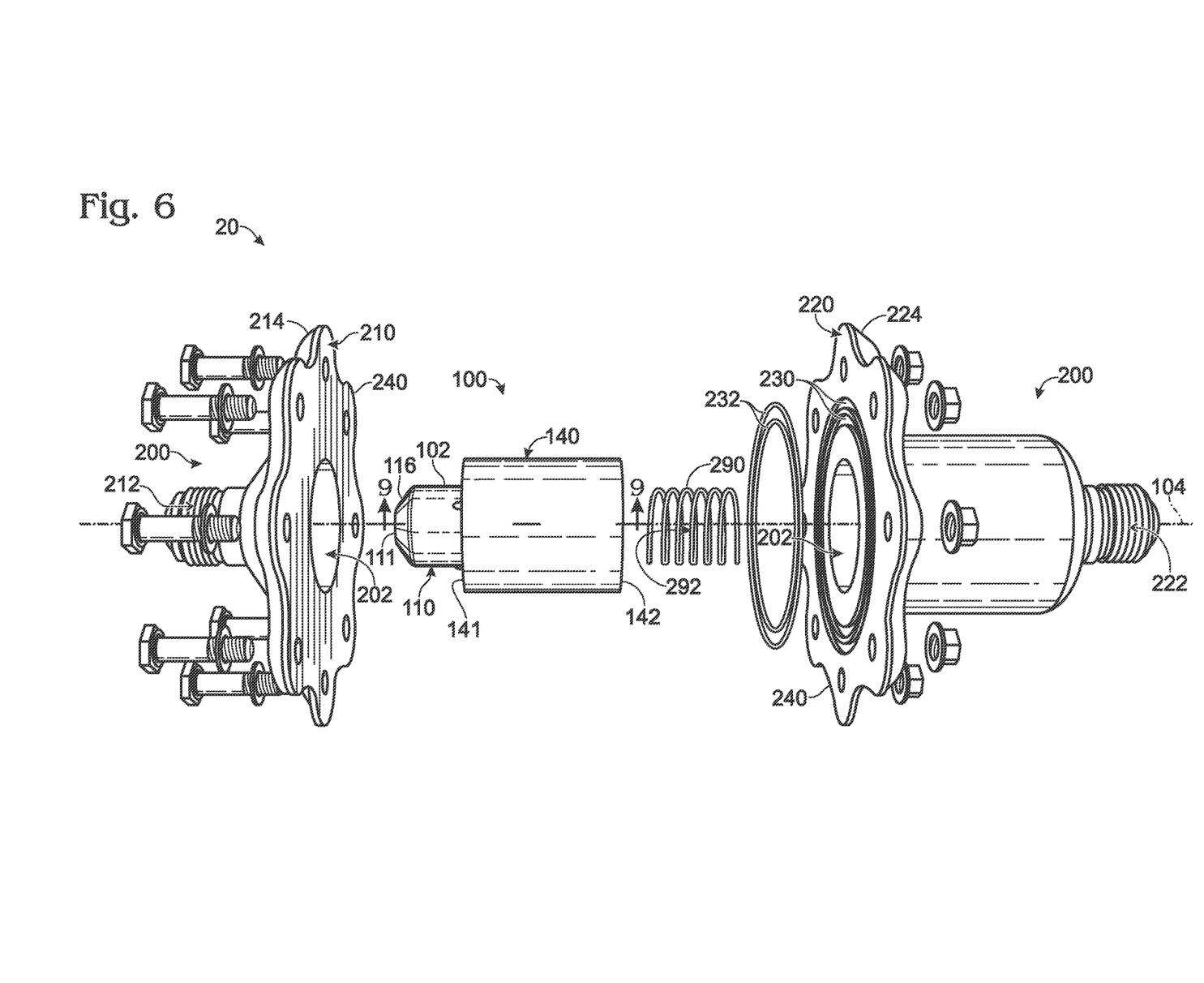
FIG. 6 is an exploded view of the check valve assembly of FIGS. 2-5.

As illustrated in 4-6, spring 290 may be a linear spring 290, in which case check valve assembly 20 may be referred to as a linear spring check valve assembly 20. Spring 290 may have any appropriate cross-sectional shape, such as a circular cross-sectional shape, an elliptical cross-sectional shape, a rectangular cross-sectional shape, a triangular cross-sectional shape, a quadrilateral cross-sectional shape, a rhomboid cross-sectional shape, a star-shaped cross-sectional shape, a hollow cross-sectional shape, an airfoil cross-sectional shape, and/or a square cross-sectional shape. Additionally or alternatively, spring 290 may have a double-helix geometry, a single leaf spring geometry, a double leaf spring geometry, a compressible origami geometry, a compressible fractal truss network of triangular truss structures, and/or any other compressible geometry. Body-side spring seat 226 of valve body 200 generally is sized to receive spring 290, such that spring 290 is received within, positioned on, and/or engaged with body-side spring seat 226.

As discussed, check valve assembly 20 is configured to resist fluid flow from outlet 222 to inlet 212 and to selectively permit fluid flow from inlet 212 to outlet 222, and generally defines the closed configuration of FIG. 4 and the open configuration of FIG. 5. Check valve assembly 20 generally is biased toward the closed configuration by spring 290, and is configured to transition from the closed configuration to the open configuration responsive to a pressure differential between inlet 212 and outlet 222 being greater than a threshold opening pressure. As used herein, the threshold opening pressure of check valve assembly 20 also may be referred to as a cracking pressure of check valve assembly 20. Check valve assembly 20 may be configured to exhibit any appropriate threshold opening pressure, examples of which include at least 5 pounds per square inch (psi) (35 kilopascals [kPa]), at least 10 psi (69 kPa), at least 20 psi (138 kPa), at least 40 psi (276 kPa), at least 60 psi (414 kPa), at least 80 psi (552 kPa), at least 100 psi (690 kPa), at most 110 psi (758 kPa), at most 90 psi (621 kpa), at most 70 psi (483 kPa), at most 50 psi (345 kPa), at most 30 psi (207 kPa), and/or at most 15 psi (103 kPa). Similarly, check valve assembly 20 generally is configured to transition from the open configuration to the closed configuration responsive to the pressure differential between inlet 212 and outlet 222 being less than a threshold closing pressure, which generally is less than the threshold opening pressure. Check valve assembly 20 additionally may include an internal actuator configured to selectively compress spring 290, such as to vary the threshold opening pressure of check valve assembly 20. As an example, check valve assembly 20 may be utilized in a spacecraft, and it may be desirable that check valve assembly 20 exhibit different threshold opening pressures in different regimes of flight, such as hypersonic flight, supersonic flight, transonic flight, and/or subsonic flight.

Valve body 200 may be a unitary valve body 200, or may include a first body half 210 and a second body half 220 as illustrated collectively by FIGS. 2-6. In embodiments in which valve body 200 includes first body half 210 and second body half 220, first body half 210 may define inlet 212 and second body half 220 may define outlet 222. In embodiments in which valve body 200 includes first body half 210 and second body half 220, and as illustrated in FIGS. 1-6, first body half 210 may include a first flange 214 and second body half may include a second flange 224 such that first body half 210 and second body half 220 are configured to be fastened together via first flange 214 and second flange 224 to define central cavity 202. Additionally, and as illustrated in FIGS. 1 and 4-6, first flange 214 and/or second flange 224 may include at least one O-ring groove 230 configured to receive a corresponding 0-ring 232 to provide a fluid seal between first flange 214 and second flange 224.

Inner surface 204 of valve body 200 may include an etched inner surface pattern that may facilitate accumulation of fluid between inner surface 204 and elongate outer skirt 140. Such fluid may function as a lubricant for relative motion between inner surface 204 and elongate outer skirt 140. The etched inner surface pattern may include and/or be rectilinear lands, spiral lands, and/or a Bejan Constructal Theory T-network of free distribution of flow.

Figure 2:
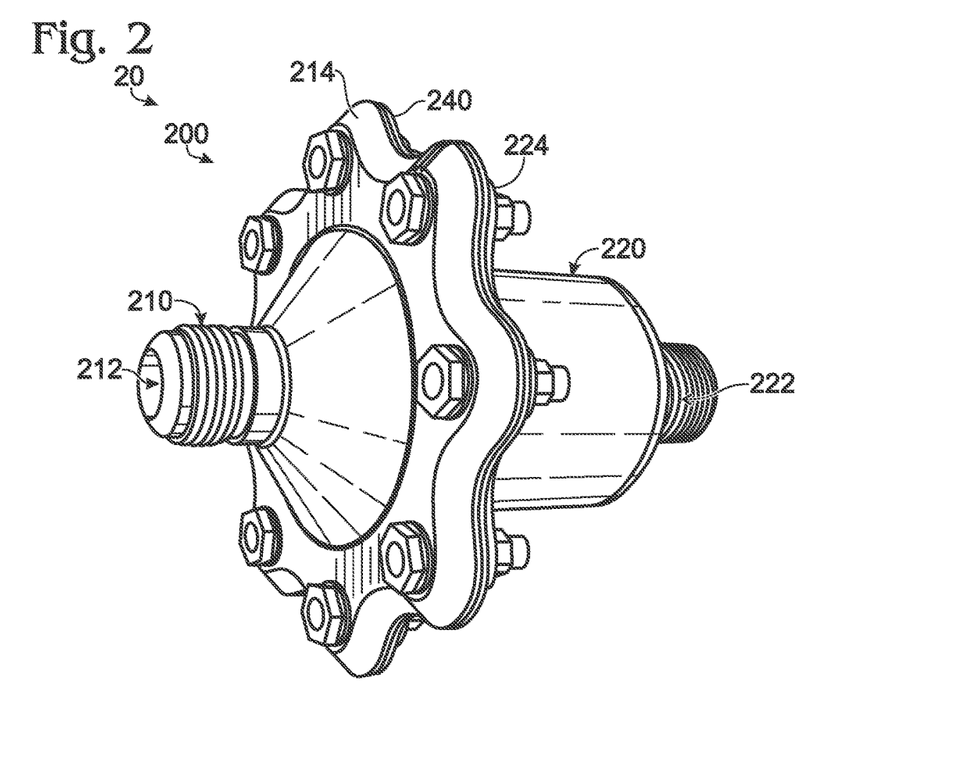
FIG. 2 is a perspective inlet side view of an example of a check valve assembly according to the present disclosure.
Figure 3:
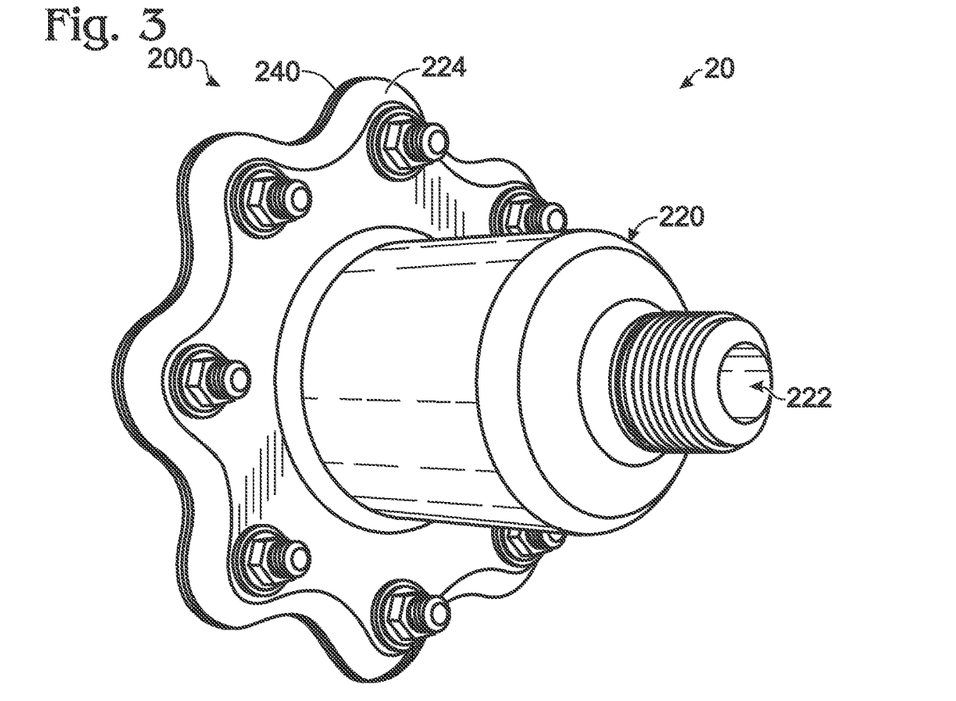
FIG. 3 is a perspective outlet side view of the check valve assembly of FIG. 2.

As illustrated in FIGS. 2-3 and 6, first flange 214 and/or second flange 224 may include an undulating cutout 240, such as which may be configured to reduce a weight of check valve assembly 20. As used herein, undulating cutout 240 also may be referred to as an undulating cross-sectional profile 240, a sinusoidal cutout 240, and/or a sinusoidal cross-sectional profile 240. First body half 210 and second body half 220 may be bolted together, welded together, brazed together, screwed together, press-fit together, and/or adhered together to define central cavity 202.

As discussed, poppet 100 is configured to form a fluid seal with valve body 200 via an interface between poppet-side sealing surface 116 and body-side sealing surface 216. Thus, it may be desirable to limit a surface roughness of body-side sealing surface 216. For example, body-side sealing surface 216 may be a machined body-side sealing surface 216. Additionally or alternatively, body-side sealing surface 216 may have an average body-side sealing surface roughness that is less than a threshold fraction of a valve body surface roughness of a remainder of valve body 200, examples of which include less than 80%, less than 60%, less than 40%, less than 30%, less than 20%, less than 10%, less than 5%, less than 1%, and/or less than 0.1%. Additionally or alternatively, body-side sealing surface 216 may be characterized by a surface roughness that is at most 100 microinch arithmetic mean roughness (mRa), at most 80 mRa, at most 60 mRa, at most 40 mRa, at most 30 mRa, at most 25 mRa, at most 20 mRa, at most 15 mRa, and/or at most 10 mRa.

Additionally, check valve assembly 20 may be configured to withstand any appropriate operating pressure. As examples, check valve assembly 20 may be configured to withstand at least 100 psig (690 kPa), at least 300 psig (2070 kPa), at least 500 psig (3450 kPa), at least 1000 psig (6900 kPa), at least 3000 psig (20700 kPa), at least 5000 psig (34500 kPa), at least 10000 psig (69000 kPa), at least 30000 psig (207000 kPa), at least 50000 psig (345000 kPa), at least 100000 psig (690000 kPa), at most 110000 psig (758000 kPa), at most 70000 psig (483000 kPa), at most 40000 psig (276000 kPa), at most 7000 psig (48300 kPa), at most 4000 psig (27600 kPa), at most 700 psig (4830 kPa), and/or at most 400 psig (2760 kPa) gauge pressure within a fluid that flows through check valve assembly 20.

Poppet 100 and valve body 200 may be formed of any appropriate materials. As examples, poppet 100 and/or valve body 200 may be formed of a stainless steel, titanium, a titanium alloy, aluminum, a plastic, a fluorocarbon, nickel, a nickel alloy, and/or a nickel, chromium, iron alloy. As further examples, poppet 100 may include a functionally graded material (FGM) with a varying coefficient of thermal expansion (CTE); may include polychlorotrifluoroethene (PCTFE), such as to facilitate a cryogenic seal; may include polyetherketoneketone (PEKK), such as for use in heat-intensive applications; and/or may include light-absorbing colors or any other color, such as red, green, pastel red, and/or pastel green.

Additionally, poppet 100 and valve body 200 may be formed via any appropriate manufacturing process. For example, poppet 100 and/or valve body 200 may be formed, at least in part, and optionally primarily, via an additive manufacturing process. As examples, poppet 100 and/or valve body 200 may be formed, at least in part, and optionally primarily, via direct metal laser sintering (DMLS), an electron beam melting process, laser freeform manufacturing technology (LFMT), selective laser melting (SLM), fused deposition modeling (FDM), laser puddle deposition (LPD), small puddle deposition (SPD), laser powder bed (LPB), electron beam powder bed (EBPD), indirect powder bed (IPD), laser deposition technology (LDT), laser repair technology (LRT), laser cladding technology (LCT), laser deposition welding (LDW), laser deposition welding with integrated milling (LDWM), selective laser sintering (SLS), direct metal printing (DMP), stereolithography (SLA), and/or any other appropriate additive manufacturing process.

As discussed, such additive manufacturing processes may reduce a weight and/or a cost of check valve assembly 20 and/or a component thereof relative to a traditional subtractive manufacturing process. For example, an additive manufacturing process may facilitate the production of a valve body 200 that includes first flange 214, second flange 224, undulating cutout 240, and/or additional chamfered edges or radius-of-curvature fillets, each of which may reduce a total weight and material cost of check valve assembly 20. Similarly, an additive manufacturing process may facilitate the production of a unitary poppet body 102 that includes non-trivial geometrical shapes such as airfoil-shaped guide vanes 160.

Additionally, additive manufacturing processes may reduce a time required to produce check valve assembly 20 or a component thereof relative to a traditional subtractive manufacturing process. For example, an additive manufacturing process may permit the manufacturing of poppet 100, of first body half 210, of second body half 220, and/or of any other component of check valve assembly 20 as a single unitary piece, and/or may reduce a need for machining and/or subtractive manufacturing. It may be desirable to utilize subtractive machining processes in manufacturing surfaces configured to form fluid-tight interfaces, such as poppet-side sealing surface 116, body-side sealing surface 216, first flange 214, second flange 224, and/or a coupling interface between check valve assembly 20 and an external fluid system. However, because such subtractive machining may represent a relatively small proportion of a total time and/or material expenditure in the production of check valve assembly 20, a use of additive manufacturing processes still may offer significant economies in the production of check valve assembly 20.

Illustrative, non-exclusive examples of inventive subject matter according to the present disclosure are described in the following enumerated paragraphs:

A1. A guide vane poppet for a check valve assembly, the guide vane poppet comprising, optionally consisting of, and further optionally consisting essentially of:

an elongate central core having a first core end, a second core end, and an outer core surface extending between the first core end and the second core end, wherein the first core end defines a poppet-side sealing surface configured to form a fluid seal with a corresponding body-side sealing surface of a valve body of the check valve assembly;

an elongate outer skirt having a first skirt end, a second skirt end, an outer skirt surface, and an inner skirt surface, wherein the outer skirt surface and the inner skirt surface extend between the first skirt end and the second skirt end; and at least one guide vane radially extending between the outer core surface and the inner skirt surface.

A2. The guide vane poppet of paragraph A1, wherein the elongate central core at least one of:

(i) is a hollow elongate central core; and (ii) defines a recess that extends from the second core end and toward the first core end.

A3. The guide vane poppet of paragraph A2, wherein the elongate central core has a core length, as measured along a longitudinal axis thereof, and further wherein the recess at least one of:

(i) extends along at least 20%, at least 30%, at least 40%, at least 50%, at least 60%, at least 70%, at least 80%, or at least 90% of the core length; and extends along at most 95%, at most 90%, at most 80%, at most 70%, at most 60%, or at most 50% of the core length.

A4. The guide vane poppet of any of paragraphs A3-A4, wherein the elongate central core defines a first core end thickness, as measured along a/the longitudinal axis of the elongate central core and between the first core end and the recess, wherein the elongate central core further defines an average core wall thickness, as measured transverse to the longitudinal axis of the elongate central core and between the outer core surface and the recess, and further wherein the first core end thickness is greater than the average core wall thickness.

A5. The guide vane poppet of paragraph A4, wherein a ratio of the first core end thickness to the average core wall thickness is at least one of:

(i) at least 1.1, at least 1.2, at least 1.4, at least 1.6, at least 1.8, or at least 2; and (ii) at most 5, at most 4, at most 3, at most 2, at most 1.75, or at most 1.5.

A6. The guide vane poppet of any of paragraphs A2-A5, wherein the recess is at least partially conical.

A7. The guide vane poppet of any of paragraphs A2-A6, wherein the recess is at least partially cylindrical.

A8. The guide vane poppet of any of paragraphs A2-A7, wherein the elongate central core further includes at least one pressure-relief opening extending from the recess and to the outer core surface.

A9. The guide vane poppet of paragraph A8, wherein the at least one pressure-relief opening is sized to decrease a pressure drop across the poppet during fluid flow through the check valve assembly.

A10. The guide vane poppet of any of paragraphs A8-A9, wherein the at least one pressure-relief opening includes a plurality of pressure-relief openings equally and circumferentially spaced about a/the longitudinal axis of the elongate central core.

A11. The guide vane poppet of paragraph A10, wherein the at least one pressure-relief opening includes at least 2, at least 3, at least 4, at least 5, or at least 6 pressure-relief openings.

A12. The guide vane poppet of any of paragraphs A8-A11, wherein the at least one pressure-relief opening has a pressure-relief opening cross-sectional area for fluid flow therethrough, wherein the outer core surface has an outer core surface area, and further wherein the pressure-relief opening cross-sectional area is at least one of:

(i) at least 1%, at least 5%, at least 10%, or at least 15% of the outer core surface area; and (ii) at most 25%, at most 20%, at most 15%, or at most 10% of the outer core surface area.

A13. The guide vane poppet of any of paragraphs A8-A12, wherein the at least one pressure-relief opening is at least one of square, rectangular, triangular, circular, elliptical, trapezoidal, quadrilateral, pentagonal, and hexagonal.

A14. The guide vane poppet of any of paragraphs A1-A13, wherein the poppet-side sealing surface is a machined poppet-side sealing surface.

A15. The guide vane poppet of any of paragraphs A1-A14, wherein the poppet-side sealing surface has an average poppet-side sealing surface roughness, wherein a remainder of the poppet has a poppet surface roughness, and further wherein the poppet-side sealing surface roughness is less than a threshold fraction of the poppet surface roughness.

A16. The guide vane poppet of paragraph A15, wherein the threshold fraction is less than 80%, less than 60%, less than 40%, less than 30%, less than 20%, less than 10%, less than 5%, less than 1%, or less than 0.1%.

A17. The guide vane poppet of any of paragraphs A1-A16, wherein a/the average poppet-side sealing surface roughness of the poppet-side sealing surface is at most 100 microinch arithmetic mean roughness (mRa), at most 80 mRa, at most 60 mRa, at most 40 mRa, at most 30 mRa, at most 25 mRa, at most 20 mRa, at most 15 mRa, or at most 10 mRa.

A18. The guide vane poppet of any of paragraphs A1-A17, wherein the outer core surface is a cylindrical, or at least substantially cylindrical, outer core surface.

A19. The guide vane poppet of any of paragraphs A1-A18, wherein the outer skirt surface is a cylindrical, or at least substantially cylindrical, outer skirt surface.

A20. The guide vane poppet of any of paragraphs A1-A19, wherein the elongate outer skirt is a hollow cylindrical elongate outer skirt.

A21. The guide vane poppet of any of paragraphs A1-A20, wherein the inner skirt surface is a cylindrical, at least partially cylindrical, or at least substantially cylindrical, inner skirt surface.

A22. The guide vane poppet of any of paragraphs A1-A21, wherein the elongate outer skirt is coaxial, or at least substantially coaxial, with the elongate central core.

A23. The guide vane poppet of any of paragraphs A1-A22, wherein the outer core surface defines an average outer diameter, or an average effective outer diameter, wherein the inner skirt surface defines an average inner diameter, or an average effective inner diameter, and further wherein the average outer diameter is at least one of:

(i) at least 20%, at least 30%, at least 40%, at least 50%, at least 60%, or at least 70% of the average inner diameter; and (ii) at most 90%, at most 80%, at most 70%, at most 60%, or at most 50% of the average inner diameter.

A24. The guide vane poppet of any of paragraphs A1-A23, wherein the at least one guide vane includes a plurality of guide vanes.

A25. The guide vane poppet of paragraph A24, wherein the plurality of guide vanes is equally and circumferentially spaced about a/the longitudinal axis of the elongate central core.

A26. The guide vane poppet of any of paragraphs A24-A25, wherein the plurality of guide vanes includes at least 2, at least 3, at least 4, at least 5, or at least 6 guide vanes.

A27. The guide vane poppet of any of paragraphs A24-A26, wherein a number of guide vanes in the plurality of guide vanes is equal to a number of pressure-relief openings in a/the at least one pressure-relief opening.

A28. The guide vane poppet of paragraph A27, wherein a corresponding pressure-relief opening extends between each adjacent pair of guide vanes of the plurality of guide vanes.

A29. The guide vane poppet of any of paragraphs A1-A28, wherein the at least one guide vane is configured to operatively support the elongate outer skirt relative to the elongate central core.

A30. The guide vane poppet of any of paragraphs A1-A29, wherein the at least one guide vane is configured to retain a fixed, or at least substantially fixed, spatial relationship between the elongate central core and the elongate outer skirt.

A31. The guide vane poppet of any of paragraphs A1-A30, wherein the at least one guide vane operatively attaches the elongate central core to the elongate outer skirt.

A32. The guide vane poppet of any of paragraphs A1-A31, wherein the at least one guide vane is shaped to direct fluid flow within an annular region that extends between the outer core surface and the inner skirt surface.

A32.1. The guide vane poppet of paragraph A32, wherein the at least one guide vane is shaped to direct fluid flow at least partially toward a/the longitudinal axis of the elongate central core.

A33. The guide vane poppet of any of paragraphs A32-A32.1, wherein the at least one guide vane is shaped to direct fluid flow within the annular region in a direction that is parallel, or at least substantially parallel, to a/the longitudinal axis of the elongate central core.

A34. The guide vane poppet of any of paragraphs A1-A33, wherein the at least one guide vane includes at least one of:
(i) an airfoil-shaped cross-sectional profile; and
(ii) a teardrop-shaped cross-sectional profile.

A35. The guide vane poppet of any of paragraphs A1-A34, wherein the poppet further includes a poppet-side spring seat configured to receive a spring, optionally wherein the poppet-side spring seat is at least partially defined by the at least one guide vane.

A36. The guide vane poppet of paragraph A35, wherein the poppet-side spring seat is defined by at least one of the second core end, the second skirt end, and a region of the at least one guide vane that extends between the second core end and the second skirt end.

A37. The guide vane poppet of any of paragraphs A35-A36, wherein the elongate central core further includes a projecting region that projects from the second core end, and wherein the projecting region is configured to extend within a central bore of the spring.

A38. The guide vane poppet of any of paragraphs A1-A37, wherein the poppet includes a unitary poppet body that defines the elongate central core, the elongate outer skirt, and the at least one guide vane.

A39. The guide vane poppet of any of paragraphs A1-A38, wherein the poppet defines a poppet length, as measured along a/the longitudinal axis of the elongate central core, and an outer diameter, as measured about a transverse cross-section of the elongate outer skirt.

A40. The guide vane poppet of paragraph A39, wherein a ratio of the poppet length to the outer diameter is at least one of:
(i) at least 1.25, at least 1.5, at least 1.75, at least 2, at least 2.25, or at least 5; and
(ii) at most 4; at most 3.5, at most 3, at most 2.5, at most 2, or at most 1.5.

A41. The guide vane poppet of any of paragraphs A39-A40, wherein the poppet length is at least one of:
(i) at least 4 centimeters (cm), at least 6 cm, at least 8 cm, or at least 10 cm; and
(ii) at most 20 cm, at most 15 cm, at most 10 cm, or at most 7.5 cm.

A42. The guide vane poppet of any of paragraphs A1-A41, wherein the elongate central core has a/the core length, as measured along a/the longitudinal axis thereof, wherein the elongate outer skirt has a skirt length, as measured along the longitudinal axis, and further wherein a ratio of the core length to the skirt length is at least one of:
(i) at least 1, at least 1.1, at least 1.2, at least 1.3, at least 1.4, or at least 1.5; and
(ii) at most 2, at most 1.8, at most 1.6, at most 1.4, or at most 1.2.

A43. The guide vane poppet of any of paragraphs A1-A42, wherein the first skirt end is positioned between the first core end and the second core end as measured along a/the longitudinal axis of the elongate central core.

A44. The guide vane poppet of any of paragraphs A1-A43, wherein the second core end is positioned between the first skirt end and the second skirt end as measured along a/the longitudinal axis of the elongate central core.

A45. The guide vane poppet of any of paragraphs A1-A44, wherein at least a fraction of a/the core length of the elongate central core projects from the first skirt end along a/the longitudinal axis of the elongate central core.

A46. The guide vane poppet of paragraph A45, wherein the fraction of the length of the elongate central core is at least one of:
(i) at least 5%, at least 10%, at least 15%, at least 20%, at least 25%, at least 30%, or at least 35%; and
(ii) at most 50%, at most 45%, at most 40%, at most 35%, at most 30%, or at most 25%.

B1. A check valve assembly, comprising:
a valve body defining:
(i) a central cavity;
(ii) an inlet to the central cavity;
(iii) an outlet from the central cavity;
(iv) a body-side sealing surface within the central cavity and proximate the inlet; and
(v) a spring seat within the central cavity and proximate the outlet;
a spring operatively engaged with the spring seat; and
the poppet of any of paragraphs A1-A46; wherein:
(i) the poppet is oriented, within the central cavity, such that the poppet-side sealing surface is proximate the body-side sealing surface; and
(ii) the spring is oriented, within the central cavity, to press against the poppet and to urge the poppet-side sealing surface into sealing engagement with the body-side sealing surface.

B2. The check valve assembly of paragraph B1, wherein the valve body is a unitary valve body.

B3. The check valve assembly of any of paragraphs B1-B2, wherein the valve body includes a first body half and a second body half.

B4. The check valve assembly of paragraph B3, wherein the first body half includes a first flange, wherein the second body half includes a second flange, and further wherein the first body half and the second body half are configured to be fastened together, via the first flange and the second flange, to define the central cavity.

B5. The check valve assembly of paragraph B4, wherein at least one of the first flange and the second flange includes at least one O-ring groove, and further wherein the check valve assembly further includes a corresponding at least one O-ring extending within the at least one O-ring groove to provide a fluid seal between the first flange and the second flange.

B6. The check valve assembly of any of paragraphs B4-B5, wherein at least one of the first flange and the second flange includes an undulating cutout optionally configured to reduce a weight of the check valve assembly.

B7. The check valve assembly of any of paragraphs B3-B6, wherein the first body half and the second body half are at least one of bolted together, welded together, brazed together, and adhered together to define the central cavity.

B8. The check valve assembly of any of paragraphs B3-B7, wherein the inlet is defined by the first body half, and further wherein the outlet is defined by the second body half.

B9. The check valve assembly of any of paragraphs B1-B8, wherein the central cavity is a cylindrical, or at least substantially cylindrical, central cavity.

B10. The check valve assembly of any of paragraphs B1-B9, wherein the body-side sealing surface is a machined body-side sealing surface.

B11. The check valve assembly of any of paragraphs B1-B10, wherein the body-side sealing surface has an average body-side sealing surface roughness, wherein a remainder of the valve body has a valve body surface roughness, and further wherein the body-side sealing surface roughness is less than a threshold fraction of the valve body surface roughness.

B12. The check valve assembly of paragraph B11, wherein the threshold fraction is less than 80%, less than 60%, less than 40%, less than 30%, less than 20%, less than 10%, less than 5%, less than 1%, or less than 0.1%.

B13. The check valve assembly of any of paragraphs B1-B12, wherein a/the average body-side sealing surface roughness of the body-side sealing surface is at most 100 mRa, at most 80 mRa, at most 60 mRa, at most 40 mRa, at most 30 mRa, at most 25 mRa, at most 20 mRa, at most 15 mRa, or at most 10 mRa.

B14. The check valve assembly of any of paragraphs B1-B13, wherein at least one of the valve body and the poppet is formed from at least one of a stainless steel, titanium, a titanium alloy, aluminum, a plastic, a fluorocarbon, nickel, a nickel alloy, and a nickel, chromium, iron alloy.

B15. The check valve assembly of any of paragraphs B1-B14, wherein at least one of the valve body and the poppet is formed via an additive manufacturing process.

B16. The check valve assembly of any of paragraphs B1-B15, wherein the check valve assembly is configured to withstand an operating pressure of at least 600 kilopascals (kPa), at least 650 kPa, at least 700 kPa, at least 750 kPa, or at least 800 kPa gauge pressure within a fluid that flows therethrough.

B17. The check valve assembly of any of paragraphs B1-B16, wherein the check valve assembly is configured to resist fluid flow from the outlet to the inlet and to selectively permit fluid flow from the inlet to the outlet.

B18. The check valve assembly of any of paragraphs B1-B17, wherein the spring is a linear spring, and further wherein the check valve assembly is a linear spring check valve assembly.

B19. The check valve assembly of any of paragraphs B1-B18, wherein the spring has at least one of a circular cross-sectional shape, an elliptical cross-sectional shape, a rectangular cross-sectional shape, a triangular cross-sectional shape, a quadrilateral cross-sectional shape, a rhomboid cross-sectional shape, a star-shaped cross-sectional shape, a hollow cross-sectional shape, an airfoil cross-sectional shape, and a square cross-sectional shape.

B19.1. The check valve assembly of any of paragraphs B1-B19, wherein the spring includes at least one of a double-helix geometry, a single leaf spring geometry, a double leaf spring geometry, a compressible origami geometry, and a compressible fractal truss network of triangular truss structures.

B20. The check valve assembly of any of paragraphs B1-B19.1, wherein the spring is received within the spring seat.

B21. The check valve assembly of any of paragraphs B1-B20, wherein the spring seat is sized to receive the spring.

B22. The check valve assembly of any of paragraphs B1-B21, wherein the check valve assembly defines an open configuration, in which the check valve assembly permits fluid flow from the inlet to the outlet, and a closed configuration, in which the check valve assembly resists fluid flow between the inlet and the outlet.

B23. The check valve assembly of paragraph B22, wherein, when the check valve assembly is in the closed configuration, the poppet-side sealing surface is sealingly engaged with the body-side sealing surface.

B24. The check valve assembly of any of paragraphs B22-B23, wherein, when the check valve assembly is in the open configuration, the poppet-side sealing surface is at least partially disengaged from the body-side sealing surface.

B25. The check valve assembly of any of paragraphs B22-B24, wherein the check valve assembly is configured to transition from the closed configuration to the open configuration responsive to a pressure differential between the inlet and the outlet being greater than a threshold opening pressure.

B26. The check valve assembly of paragraph B25, wherein the threshold opening pressure is at least one of:
(i) at least 5 psi (35 kPa), at least 10 psi (69 kPa), at least 20 psi (138 kPa), at least 40 psi (276 kPa), at least 60 psi (414 kPa), at least 80 psi (552 kPa), or at least 100 psi (690 kPa); and
(ii) at most 110 psi (758 kPa), at most 90 psi (621 kpa), at most 70 psi (483 kPa), at most 50 psi (345 kPa), at most 30 psi (207 kPa), or at most 15 psi (103 kPa).

B27. The check valve assembly of any of paragraphs B22-B26, wherein the check valve assembly is configured to transition from the open configuration to the closed configuration responsive to a/the pressure differential between the inlet and the outlet being less than a threshold closing pressure.

B28. The check valve assembly of paragraph B27, wherein the threshold closing pressure is less than a/the threshold opening pressure.

B29. The check valve assembly of any of paragraphs B1-B28, wherein the valve body has an inner surface, and further wherein the inner surface includes an etched inner surface pattern configured to facilitate accumulation of a lubricant between the inner surface and the elongate outer skirt of the poppet.

B30. The check valve assembly of paragraph B29, wherein the etched inner surface pattern includes at least one of a rectilinear land, a spiral land, and a Bejan Constructal Theory T-network.

B31. The check valve assembly of any of paragraphs B1-B30, wherein a/the recess of the poppet includes an etched recess pattern configured to wick fluid past a/the at least one pressure-relief opening and toward the second core end.

B32. The check valve assembly of paragraph B31, wherein the etched recess pattern includes at least one of a rectilinear land, a spiral lands, and a Bejan Constructal Theory T-network.

B33. The check valve assembly of any of paragraphs B1-B32, wherein the check valve assembly further includes an internal actuator configured to selectively compress the spring 290 to vary a/the threshold opening pressure of the check valve assembly.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The invention claimed is:

1. A guide vane poppet for a check valve assembly, the guide vane poppet comprising:
    an elongate central core extending between a first core end and a second core end and having a monolithic outer core surface that extends between the first core end and the second core end, wherein the first core end is a poppet-side sealing surface configured to form a fluid seal with a corresponding body-side sealing surface of a valve body of the check valve assembly, and further wherein the elongate central core defines a recess that extends from the second core end and toward the first core end;
    an elongate outer skirt having a first skirt end, a second skirt end, an outer skirt surface, and an inner skirt surface, wherein the outer skirt surface and the inner skirt surface extend between the first skirt end and the second skirt end; and
    at least one guide vane radially extending between the outer core surface and the inner skirt surface;
    wherein the elongate outer skirt is configured to slidingly engage an inner surface of the valve body of the check valve assembly.

2. The guide vane poppet of claim 1, wherein the recess is at least partially cylindrical.

3. The guide vane poppet of claim 1, wherein the elongate central core has a core length, as measured along a longitudinal axis thereof, and wherein the recess extends along at least 60% of the core length.

4. The guide vane poppet of claim 1, wherein the elongate central core further includes at least one pressure-relief opening extending from the recess and to the outer core surface, wherein the at least one pressure-relief opening is sized to decrease a pressure drop across the poppet during fluid flow through the check valve assembly and provides a flow path for fluid to flow from external the elongate central core into and through the recess.

5. The guide vane poppet of claim 4, wherein the at least one pressure-relief opening is positioned, on the outer core surface, between the first core end and the second core end.

6. The guide vane poppet of claim 1, wherein the inner skirt surface is an at least substantially cylindrical inner skirt surface.

7. The guide vane poppet of claim 1, wherein the elongate outer skirt is at least substantially coaxial with the elongate central core, wherein the outer core surface defines an average outer diameter, wherein the inner skirt surface defines an average inner diameter, and further wherein the average outer diameter is at least 30% and at most 80% of the average inner diameter.

8. The guide vane poppet of claim 1, wherein the poppet defines a poppet length, as measured along a longitudinal axis of the elongate central core, and an outer diameter, as measured about a transverse cross-section of the elongate outer skirt, and wherein a ratio of the poppet length to the outer diameter is at least 1.5.

9. The guide vane poppet of claim 1, wherein the elongate central core has a core length, as measured along a longitudinal axis thereof, wherein the elongate outer skirt has a skirt length, as measured along the longitudinal axis, and further wherein a ratio of the core length to the skirt length is at least 1 and at most 2.

10. The guide vane poppet of claim 1, wherein the first skirt end is positioned between the first core end and the second core end as measured along a longitudinal axis of the elongate central core.

11. The guide vane poppet of claim 1, wherein the at least one guide vane is shaped to direct fluid flow within an annular region that extends between the outer core surface and the inner skirt surface in a direction that is at least substantially parallel to a longitudinal axis of the elongate central core.

12. The guide vane poppet of claim 1, wherein the poppet further includes a poppet-side spring seat configured to receive a spring, wherein the elongate central core further includes a projecting region that projects from the second core end, and wherein the projecting region is configured to extend within a central bore of the spring.

13. The guide vane poppet of claim 1, wherein the poppet-side sealing surface is a machined poppet-side sealing surface, wherein the poppet-side sealing surface has an average poppet-side sealing surface roughness, and further wherein the average poppet-side sealing surface roughness is at most 80 microinch arithmetic mean roughness (mRa).

14. The guide vane poppet of claim 1, wherein the guide vane poppet is configured to maintain a fixed spatial relationship among the elongate central core, the elongate outer skirt, and the at least one guide vane when the guide vane poppet is utilized within the check valve assembly.

15. A check valve assembly, comprising:
a valve body defining:
(i) a central cavity;
(ii) an inlet to the central cavity;
(iii) an outlet from the central cavity;
(iv) a body-side sealing surface within the central cavity and proximate the inlet; and
(v) a spring seat within the central cavity and proximate the outlet;
a spring operatively engaged with the spring seat; and
the poppet of claim 1; wherein:

(i) the poppet is oriented, within the central cavity, such that the poppet-side sealing surface is proximate the body-side sealing surface; and
(ii) the spring is oriented, within the central cavity, to press against the poppet and to urge the poppet-side sealing surface into sealing engagement with the body-side sealing surface.

16. The check valve assembly of claim 15, wherein the check valve assembly defines an open configuration, in which the check valve assembly permits fluid flow from the inlet to the outlet, and a closed configuration, in which the check valve assembly resists fluid flow between the inlet and the outlet; wherein, when the check valve assembly is in the closed configuration, the poppet-side sealing surface is sealingly engaged with the body-side sealing surface; and further wherein, when the check valve assembly is in the open configuration, the poppet-side sealing surface is at least partially disengaged from the body-side sealing surface.

17. The check valve assembly of claim 15, wherein the spring is a linear spring, and further wherein the check valve assembly is a linear spring check valve assembly.

18. The check valve assembly of claim 17, wherein the spring includes a central bore, and further wherein the inlet is fluidly connected to the outlet via a fluid path that includes the central bore.

19. The check valve assembly of claim 15, wherein at least one of the valve body and the poppet is formed via an additive manufacturing process.

20. A guide vane poppet for a check valve assembly, the guide vane poppet comprising:
an elongate central core extending between a first core end and a second core end and having an outer core surface that extends between the first core end and the second core end, wherein the first core end is a poppet-side sealing surface configured to form a fluid seal with a corresponding body-side sealing surface of a valve body of the check valve assembly;
an elongate outer skirt having a first skirt end, a second skirt end, an outer skirt surface, and an inner skirt surface, wherein the outer skirt surface and the inner skirt surface extend between the first skirt end and the second skirt end;
at least one guide vane radially extending between the outer core surface and the inner skirt surface; and
at least one pressure-relief opening positioned on the outer core surface;
wherein the elongate outer skirt is configured to slidingly engage an inner surface of the valve body of the check valve assembly.

21. The guide vane poppet of claim 20, wherein the elongate central core defines a recess that extends from the second core end and toward the first core end.

22. The guide vane poppet of claim 21, wherein the at least one pressure-relief opening extends from the recess and to the outer core surface, wherein the at least one pressure-relief opening is sized to decrease a pressure drop across the guide vane poppet during fluid flow through the check valve assembly and provides a flow path for fluid to flow from external the elongate central core into and through the recess.

23. The guide vane poppet of claim 22, wherein the at least one pressure-relief opening is positioned on the outer core surface, between the first core end and the second core end.

* * * * *